(12) United States Patent
Olivas

(10) Patent No.: US 6,374,852 B1
(45) Date of Patent: Apr. 23, 2002

(54) LEAK ARRESTING VALVE

(75) Inventor: John D. Olivas, Houston, TX (US)

(73) Assignee: Brightvalve, LLC, Redondo Beach, CA (US)

( * ) Notice: Subject to any disclaimer, the term of this patent is extended or adjusted under 35 U.S.C. 154(b) by 0 days.

(21) Appl. No.: 09/634,181

(22) Filed: Aug. 9, 2000

(51) Int. Cl.$^7$ .............................................. F16K 17/26
(52) U.S. Cl. ................ 137/493.9; 137/494; 137/512.2; 137/517; 137/509
(58) Field of Search ............................. 137/494, 517, 137/512.2, 509, 512.3, 493.9

(56) References Cited

U.S. PATENT DOCUMENTS

| | | | | |
|---|---|---|---|---|
| 3,344,806 A | * | 10/1967 | Schultz | 137/512.2 |
| 3,707,984 A | * | 1/1973 | Bantz | 137/312 |
| 4,257,452 A | * | 3/1981 | Hill et al. | 137/514.7 |
| 4,294,278 A | * | 10/1981 | Blake | 137/115.26 |
| 4,880,030 A | * | 11/1989 | Terry | 137/460 |
| 5,158,207 A | * | 10/1992 | Daele | 222/52 |
| 5,320,135 A | * | 6/1994 | Pierrou | 137/513.3 |
| 5,365,974 A | * | 11/1994 | Maravic | 137/493 |
| 5,829,478 A | * | 11/1998 | Pape et al. | 137/517 |

\* cited by examiner

*Primary Examiner*—A. Michael Chambers
*Assistant Examiner*—Thomas L. McShane
(74) *Attorney, Agent, or Firm*—Price and Gess

(57) ABSTRACT

A flow control valve is disclosed wherein a housing defines a flow chamber with an inlet and an outlet. Disposed within the flow chamber is a telescoping poppet comprising an inner poppet and an outer poppet. A first spring is selected to bias the outer poppet to seal closed the inlet below a predetermined fluid flow rate. Above the fluid flow rate, the force of the fluid against the outer poppet compresses the spring, breaking the seal and allowing fluid to flow into the fluid flow chamber. Inside the outer poppet is an inner poppet which telescopes from the outer poppet. A second spring biases the inner poppet predominantly within the outer poppet, but an increased pressure in the outer poppet collapses the second spring and extends the inner poppet in a fully extended position. Fully extended the inner poppet seals shut the outlet of the fluid chamber. In operation, the first spring shuts the valve below a predetermined flow rate guaranteeing zero flow until a minimum flow rate is present. Furthermore, if a leak occurs downstream (beyond the outlet) or the flow rate is above a predetermined maximum flow rate the second spring is collapsed by an upstream/downstream pressure differential causing the inner poppet to seal the outlet. Thus, the valve operates only between a minimum and maximum flow rate and seals in the event of a downstream leak.

14 Claims, 2 Drawing Sheets

LEAK ARRESTING VALVE

BACKGROUND OF THE INVENTION

1. Field of the Invention

The present invention relates generally to flow control valves, and more particularly to a purely mechanical leak arresting flow control valves that regulate fluid flow between a minimum flow rate and a maximum flow rate, and can detect leaks below and above the minimum and maximum flow rates, respectively, and close the valve in the presence of a leak.

2. Description of Related Art

Valves used in the regulation of fluid flow are well known in the art. Valves can be used to maintain fluid flow in a particular direction, or as a safety feature to prevent too high of a flow rate or too low of a flow rate. Valves can be mechanically or electrically actuated devices that use the dynamic pressure in a fluid flow to compress a spring or move a ball, thereby allowing the fluid either to pass through the valve or be blocked by the valve.

The present invention is directed to a flow regulating valve which allows continuous fluid flow in a predetermined range, as opposed to a pulse flow. Valves used for this purpose are useful for many applications which require a supply of a liquid or a gas, collectively a fluid, such as a washing machine, ice maker, or gas stove. The present invention includes a new feature not found in the prior art valves, namely, a purely mechanical leak detecting function. The invention is a mechanical valve which regulates the flow of fluid within a predetermined minimum and maximum flow rate, and further mechanically closes the valve when either a small or large downstream leak occurs. Thus, while prior art purely mechanical safety valves will close shut, and thereby stop the fluid flow if a major leak occurs due to the sudden increase in the fluid flow rate, the prior art valves lack the ability to close shut in the event of a small leak such as might occur due to a small breach in the downstream fluid line or the gradual failure of a downstream component. This situation could be of critical importance if, say, the fluid is hazardous or flammable, if the fluid line is not regularly maintained due to its location or conditions of use, or if subsequent damage from such a line breach would be economically or environmentally unacceptable. The response of the valve may be the only indication that a small leak has occurred. The present invention solves the problem that the prior art valves fail to address.

SUMMARY OF THE INVENTION

The present invention comprises a valve housing forming a flow chamber thereinthrough with an inlet and an outlet. Within the flow chamber is a flow arresting member comprising a pair of poppets cooperating to telescope within the flow chamber. The first poppet is a hollow outer poppet biased against the valve inlet by a first spring, shutting the valve to flow rates below a predetermined minimum flow rate governed by the spring constant. Within the first outer poppet is a second inner poppet anchored within the first poppet and extending through an opening in the outer poppet in a telescoping relationship. The second poppet is biased in the first poppet by a second spring such that the second poppet extends from the first poppet when the fluid pressure in the cavity of the first poppet exceeds the pressure at the outlet of the valve by more than a critical value determined by the second spring constant. When the second poppet fully extends (or "telescopes") from the first poppet, the second poppet plugs the outlet and closes the valve to subsequent fluid flow through the valve. This condition occurs when either a small leak or a large leak occurs is present downstream of the valve. Further, if a flow rate is too large, the first outer poppet will completely collapse its biasing spring such that the outlet to the valve is blocked. Thus, only a predetermined flow rate between a minimum flow rate and a maximum flow rate is permitted through the valve.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a mechanical leak arresting valve.

Figure 1:
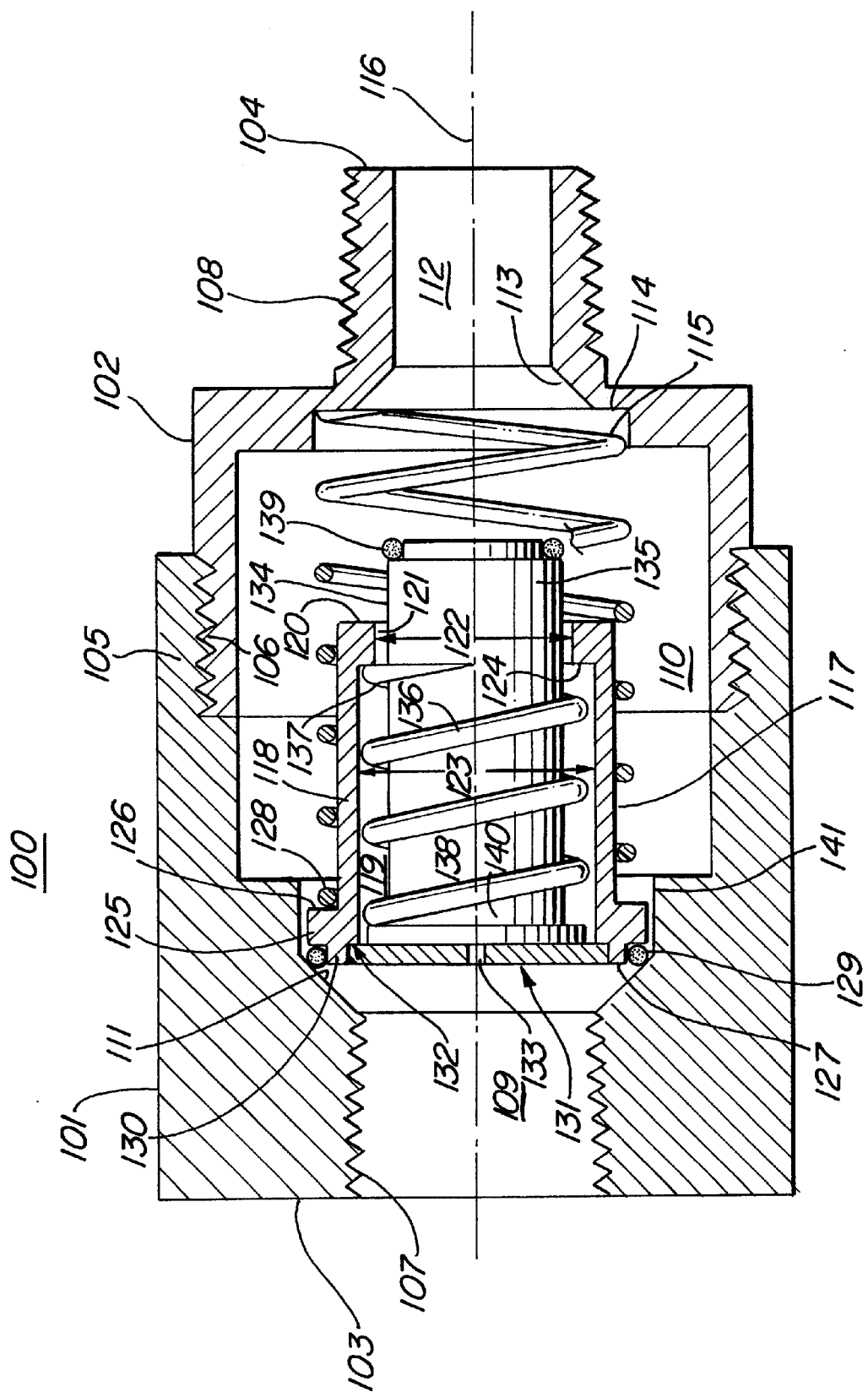
FIG. 1 is a cross sectional view of a preferred embodiment of the resent invention illustrating a condition below a minimum flow rate.

FIG. 1 illustrates a valve (generally denoted 100) having a housing with an inlet side 103 and an outlet side 104. The housing is formed by two mating halves, a male half 102 with a threaded portion 106 and a female half 101 with a threaded portion 105. The two halves 101,102 engage via the mating threaded portions 105,106 to form a fluid-tight valve. The valve 100 has a threaded inlet 107 designed to receive a piping component (not shown) ultimately connected to a fluid source, and threaded outlet 108 adapted to fit in a piping component (not shown) ultimately leading to a fluid recipient. The valve 100 serves as an intermediary between the fluid source and the fluid destination, and shuts off the supply of fluid unless predetermined flow conditions occur in the absence of a downstream leak. For purposes of this disclosure, it is understood that the term "fluid" can refer to either a liquid or a gas and the valve can be designed to operate using both mediums.

FIG. 1 shows the inlet 109 as a cylindrical passage funneling out at the entrance to the flow chamber 110 via a chamfered section 111. The chamfered section 111 terminates at the flow chamber 110, a cylindrical region within the valve housing. The outlet 112 is also depicted as a cylindrical passage opening to the flow chamber 110 via a chamfered section 113. The outlet side of the flow chamber includes a recessed region 114 just outside of the outlet chamfer 113. The recessed region 114 seats a helical spring 115 with a longitudinal axis colinear with a longitudinal axis 116 of both the valve inlet 109 and the valve outlet 112.

The helical spring 115 operates on a telescoping poppet disposed within the flow chamber 110 of the valve 100. The telescoping poppet includes an outer poppet 117 which has a hollow cylindrical body 118 that is disposed within the helical spring 115. The hollow body 118 defines a flow cavity 119 therein, and an end 120 of the hollow body 118 of the outer poppet 117 terminates in an opening 121 to the flow cavity 119. The opening 121 of the outer poppet 117 has a diameter 122 smaller than the internal diameter 123 of the flow cavity 110, defining an inner shoulder 124 at the opening 121 within the flow cavity 110. The outer poppet 117 also includes a base 125 with a cylindrical tab of a greater diameter than the outer diameter of the cylindrical body 118, defining a lip 126 adjacent the end 127 of the outer poppet 117. The end 128 of the helical spring 115 abuts the lip 126 of the outer poppet 117, and applies a force thereto in the direction of the inlet side 103 of the valve 100. Across the lip 126 of the outer poppet 117 is an o-ring 129 seated on a circumferential rim 130, where the o-ring 129 cooperates with the chamfered portion 111 of the inlet 109 to seal the valve at the inlet when the helical spring 115 forces the outer poppet 117 against the inlet 109 of the valve.

The outer poppet 117 is capped at the end 127 by an orifice plate 131 seated in a circumferential recess 132 in the end of the outer poppet 117. The orifice plate 131 includes a small orifice 133 for communicating fluid from the inlet side of the valve (when the outer poppet is held against the inlet as described above) or from the flow chamber (when the outer poppet is not held against the inlet—see FIG. 2) to the flow cavity 119 inside the outer poppet 117. Thus, the flow cavity 119 inside the outer poppet 117 is in fluid communication with the upstream fluid conditions via the orifice 133.

Within the outer poppet 117 and anchored inside the flow cavity 119 is a second, inner poppet 134. The cylindrical body 135 of the inner poppet 134 is preferably longer than the cylindrical body 118 of the outer poppet 117 such that the inner poppet 134 protrudes out of the outer poppet 117 at the opening 121 of the outer poppet 117. Further, the inner poppet 134 includes a head 140 having a diameter greater than the diameter 122 of the opening 121 of the outer poppet 117 and thus captures the inner poppet 134 inside the outer poppet 117 in a telescoping relationship. A second helical spring 136 is wrapped about the cylindrical body 135 of the inner poppet 134 with a first end 137 abutting the inner shoulder 124 of the outer poppet 117 and the second end 138 abutting the head 140 of the inner poppet 134. The force of the second helical spring 136 biases the inner poppet 134 against the orifice late 131 in the absence of a pressure differential to collapses the spring. The cylindrical body 135 of the inner poppet 134 is provided with an o-ring 139 sized to seal the outlet 112 of the valve 100 when the inner poppet 134 is forced against the chamfered portion 113 of the outlet 112 of the valve.

As will be described more fully below, the combination of the outer poppet 117 and the inner poppet 134 form a telescoping poppet, or flow arresting element, wherein the inner poppet 134 extends through the outer poppet 117 of varying lengths, while remaining permanently anchored within the outer poppet 117. Depending on varying pressure conditions upstream and downstream of the valve, the two poppets will telescope from a fully retracted position when the inner spring 136 is completely extended to a fully protracted position with the second spring 136 fully compressed. The operation of the valve 100 will now be described in detail.

In FIG. 1, the valve is shown in a static condition wherein fluid is present in the valve, but no fluid is flowing through the valve. This condition could occur if an apparatus downstream of the valve drawing fluid from a source upstream of the valve, such as for example a washing machine, completed its cycle and turned off. In this situation, fluid remains in the line, including the valve, and the pressure in the line both upstream of the valve and downstream of the valve is approximately constant. Since the pressure in the upstream side of the valve is approximately equal to the pressure downstream, there is no fluid flow in the line and no pressure differential to move the outer poppet 117. The helical spring 115 forces the outer poppet 117 against the inlet side of the valve with enough force that the o-ring 129 on the outer poppet 117 is compressed between the outer poppet and the chamfered portion 111 of the valve inlet 109. The compression of the o-ring 111 seals the valve in a manner such that no fluid can pass into the flow chamber 110 around the outer poppet 117.

Additionally, the pressure at the inlet 109, and thus at the orifice plate 131, is approximately equal to the pressure at the outlet 112 and in the flow chamber 110. Absent a pressure differential, the second helical spring 136 operates on the head 140 of the inner poppet 134 to force the inner poppet against the orifice plate 131 and prevent fluid from entering the flow cavity 119 through the orifice 133. Therefore, the static flow condition shown in FIG. 1 prevents fluid flow through the valve by completely sealing the inlet 109 of the valve. The valve will remain in this condition until a pressure differential corresponding to a flow rated sufficient to compress the helical spring 115 is experienced by the valve.

Figure 2:
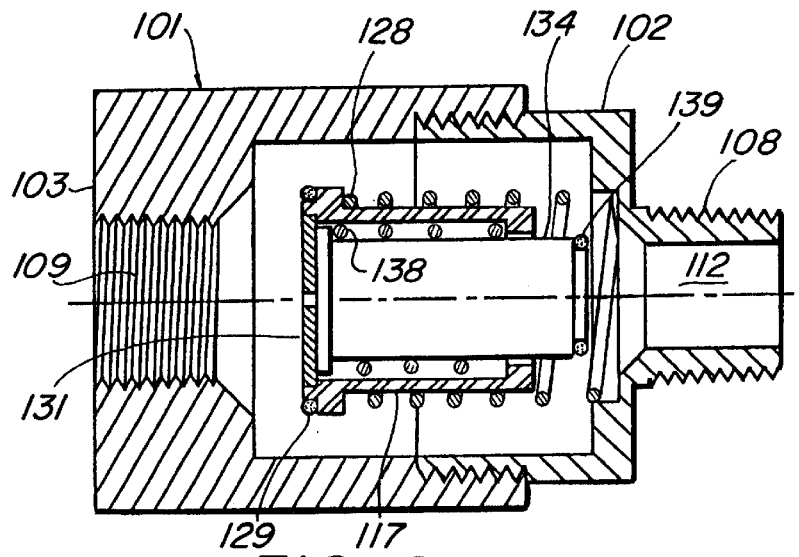
FIG. 2 is a cross sectional view of a preferred embodiment of the present invention illustrating a condition between a minimum flow rate and a maximum flow rate.

In FIG. 2, a flow rate is introduced through the valve by a pressure differential between the downstream condition and the upstream condition. This could occur because the fluid recipient, such as a washing machine, is turned on and the fluid (in this case, water) is allowed to enter the washing machine. The flow of water into the washing machine reduces the pressure downstream, creating a pressure differential between the downstream condition and the upstream condition. Without the valve, the presence of a pressure differential would be enough to generate a fluid flow from the higher pressure upstream to the lower pressure downstream. However, the valve denies a fluid flow below a minimum flow rate governed by the selection of the helical spring 115. The spring is selected so that, below a minimum pressure differential, the force of the spring overcomes the force of the fluid on the orifice plate 131 and the valve remains positioned as shown in FIG. 1. However, if the pressure differential reaches the minimum pressure differential determined by the spring constant of spring 115, the pressure on the orifice plate 131 will be greater than the force of the spring 115, and the two poppets 117,134 will traverse in the valve chamber 110 away from the inlet 109, breaking the seal at the fluid inlet 109.

As FIG. 2 illustrates, if the flow rate remains above the minimum flow rate and below a maximum flow rate, the poppets 117,134 will be located between the inlet side of the valve and the outlet side of the valve, permitting fluid to readily flow around the poppet and through the valve. This is the desirable condition when the system is in operational mode and the spring 115 has been selected for the proper flow conditions for the particular fluid recipient. Each fluid recipient, whether it be a dishwasher, a washing machine, or a natural gas stove, would govern the type of spring used to control the movement of the poppets.

The function of the orifice plate 131 is to regulate the rate at which the inner poppet 117 telescopes. The inner poppet 134 responds to a reduction in the downstream pressure by translating against the force of the inner spring 136 when the pressure differential inside the cavity 119 is greater than the pressure inside the valve chamber 110 by an amount sufficient to collapse the inner spring 136. During nominal flow operation, the downstream pressure is reduced and this reduction in downstream pressure is communicated to the valve chamber 110. However, the pressure in the cavity 119 is slower to equalized (compared to the chamber) because of the size of the orifice 133, which allows fluid to enter the cavity 119. The inner poppet 117 responds to the reduction in the downstream pressure by translating or telescoping from the fully retracted position to an extended position. The differential pressure across the orifice 133 eventually causes fluid to fill the cavity 119 between the inner poppet 134 and the outer poppet 117, until the pressures in the cavity 119 and the chamber 110 are equal. When the cavity 119 equalizes with the valve chamber 110, the inner poppet 134 is no longer subject to a pressure differential and the inner spring 136 returns the inner poppet 134 to its retracted position (as shown in FIG. 2). In this manner, the orifice plate and in particular the orifice itself regulates the rate that the inner poppet telescopes.

The spring 115 selected to control the movement of the outer poppet 117 may be either a single stage spring (constant spring coefficient) or a multistage spring with a variable spring coefficient. A multistage spring could allow different flow regimes where the allowable flow rate is governed by a first stage and the onset of fluid flow governs a second flow regime. Thus, if a flow rate of 12 to 15 gallons per minute is needed for a particular application, it is desirable to have a first stage of spring movement wherein the force from the first 12 gpm results in a negligible movement of the spring, but the force applied from 15 gpm is sufficient to compress the spring fully. Thus, the spring will allow the poppet to reside intermediate to both the inlet and the outlet between pressures corresponding to flow rates between 12 and 15 gpm, and the fluid recipient will operate within the specified flow rate.

Figure 3:
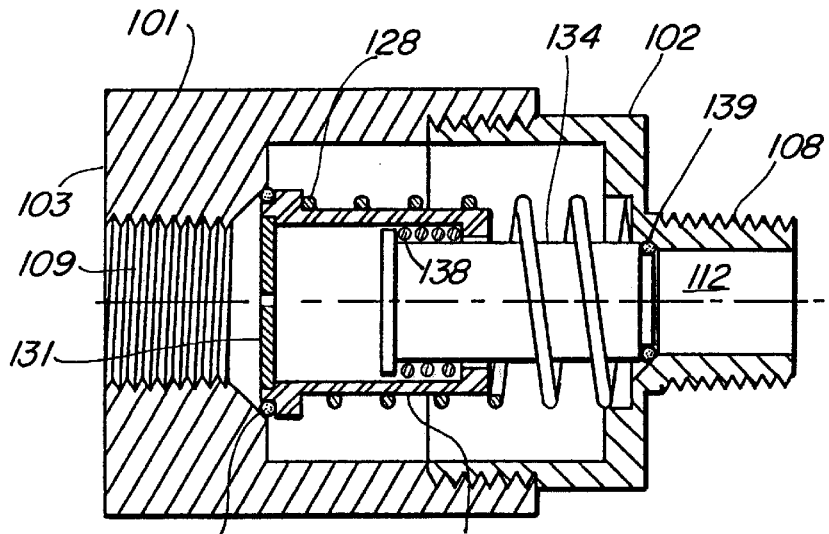
FIG. 3 is a cross sectional view of a preferred embodiment of the present invention in the presence of a leak.

FIG. 3 shows the valve condition in the presence of a small leak downstream of the valve. In many applications it is desirable to halt the flow of fluid when a leak occurs downstream. For example, if the washing machine in the previous example suddenly began to leak water in the non-operating condition, without a valve such as the present invention water could leak indefinitely until discovered, causing damage and even danger. Similarly, in the handling of toxic fluids the importance of the control of leaks are clear. Returning to FIG. 3, the configuration of the valve is initially as that shown in FIG. 1, i.e. a static condition. However, in a small leak condition fluid begins to leak slowly at some point downstream of the valve. Because the inlet side of the valve is sealed below a minimum flow rate, the inlet pressure is isolated from the outlet (or downstream) pressure (see FIG. 1).

As the leak continues, the pressure downstream drops until a pressure differential between the pressure at the inlet 109 and a pressure at the outlet 112 causes the inner poppet 134 to move away from the orifice plate 131, permitting fluid to enter the flow cavity 119. The pressure in the flow cavity 119 approximates the pressure upstream of the inlet, and the difference in pressure between the flow cavity 119 and the flow chamber 110, i.e. the outlet pressure, causes the inner poppet 134 to extend out of the flow cavity 119. When the pressure differential reaches a predetermined value, the inner poppet 134 will "telescope" or extend fully from outer poppet 117 such that the o-ring 139 engages the chamfered portion 113 of the outlet 112. The contact of the o-ring 139 with the outlet closes the flow of fluid through the valve. As long as the leak is present, the downstream pressure will be less than the upstream pressure and the inner poppet 134 will continue to close the valve at the outlet. Thus, the flow of fluid through the valve has been arrested in the presence of a small downstream leak.

Figure 4:
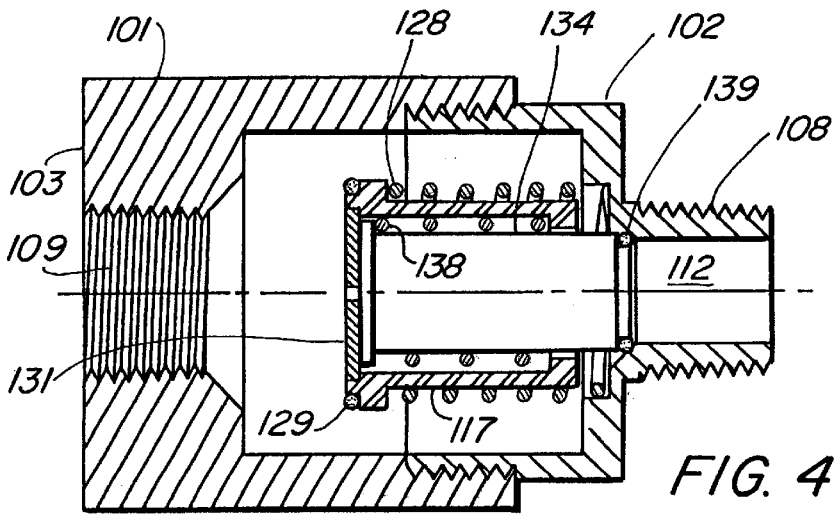
FIG. 4 is a cross sectional view of a preferred embodiment of the present invention illustrating a condition above a maximum flow rate.

FIGS. 3 and 4 illustrate the two stages that the valve undergoes in the presence of a large leak, i.e. a sudden loss of pressure downstream of the valve. In this scenario, the equilibrium of FIG. 1 is disturbed when pressure is suddenly lost at the outlet side of the valve, causing the outer poppet 117 to compress the spring completely (FIG. 4). The inner poppet 134, protruding from the outer poppet 117, reaches the outlet 112 and in cooperation with the o-ring 139 seals the outlet of the valve. This condition is shown in FIG. 4. With the flow of fluid now arrested by the sealing of the outlet, the pressure in the flow chamber 110 quickly equalizes to the inlet pressure causing the spring 115 to return the outer poppet 117 to its static position abutting the inlet. However, the pressure differential between the inlet 109 and the outlet 112 still exists, and the inner poppet 134 remains extended or telescoped by the pressure differential. Thus, after the equalization of the flow chamber the valve is configured the same as condition as FIG. 3, i.e., the outer poppet 117 is maintained against the inlet 109 sealing the inlet except for the orifice 133 which feeds the flow cavity 119, and the inner poppet 134 is forced against the outlet 112 and seals the outlet from flow through the valve. Thus with either a small leak or a large leak the valve eventually ends up closing the valve as shown in FIG. 3.

The valve may be optionally equipped with a throttling region 141 just outside the chamfered section 111 of the inlet, shown in FIG. 1 as a narrowing or necking of the flow chamber. The length and tolerances of the throttling region is determined by the particular application. The function of the throttling region controls the amount of fluid escaping past the poppets during the transition stage between static and normal flow conditions. As the outer poppet transitions away from the inlet, the pressure drop decreases as the amount of fluid increases, which in turn affects the way the valve opens. The use of a throttling region can be used in place of a multistage spring to provide a first flow regime in the transition stage of the valve and a second regime in the normal flow stage of the valve. The throttling region could vary in diameter or have a constant diameter, depending on how the throttling region is to be used. In FIG. 1, a constant diameter throttling region is depicted. Conversely, the valve can operate without a throttling region, where the inlet opens up directly to the full flow chamber. It is envisioned that there are many other applications for the valve of the present invention through minor deviations in geometry, material selection and throttling technologies. The concept of the present flow arresting valve can not only be used for residential water, but it can be used for industrial, refinery, marine, municipal, petrochemical, hospital and medical applications. The present invention is ideally suited for any application of a fluid conduit for either liquid or gas that has a requirement to not allow, or to minimize, spills as a result of very low or very high leak rates. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flow control valve comprising:
   a housing defining a flow chamber therein including an inlet and an outlet;
   a telescoping poppet located in the flow chamber comprising a hollow outer member and an inner member anchored within the outer member and extendable therefrom;
   a first biasing element for biasing the outer member of the telescoping poppet toward the inlet; and
   a second biasing element for biasing the inner member of the telescoping popper within the outer member.

2. The flow control valve of claim 1 wherein said first biasing element comprises a multistage helical spring.

3. The flow control valve of claim 1 wherein said flow chamber includes a throttling region adjacent the inlet.

4. The flow control valve of claim 1 wherein said outer member of the telescoping poppet includes an orifice for communicating a fluid pressure at the inlet to a cavity within the outer member.

5. The flow control valve of claim 1 wherein the second biasing member is disposed within the outer member of the telescoping poppet.

6. The flow control valve of claim 1 further comprising a first o-ring disposed between the outer member of the telescoping poppet and the inlet, and a second o-ring disposed between the inner member of the telescoping poppet and the outlet.

7. A flow control valve comprising:
   a housing comprising a fluid inlet and a fluid outlet and a flow chamber defined within said housing;
   a first fluid flow arresting member within said flow chamber having a first end adapted to partially close said fluid inlet at a fluid flow rate below a predetermined fluid flow rate; and
   a second fluid flow arresting member telescopically cooperating with said first fluid flow arresting member to completely close said fluid inlet below a minimum flow rate condition and to close said fluid outlet in the presence of a fluid leak downstream of the outlet.

8. The flow control valve of claim 7 further comprising a first spring biasing the first fluid flow arresting element in a sealing relationship with the fluid inlet.

9. The flow control valve of claim 8 wherein said first spring comprises a multistage spring.

10. The flow control valve of claim 8 further comprising a second spring biasing the second fluid flow arresting element from a sealing relationship with the fluid outlet until a predetermined pressure differential between an inlet pressure and an outlet pressure is achieved.

11. The flow control valve of claim 10 wherein said second spring is disposed completely within the first fluid flow arresting element.

12. The flow control valve of claim 7 wherein the flow chamber includes a throttling region for controlling the pressure in the flow chamber.

13. A flow control valve comprising:
   a flow chamber defined by a housing having a flow inlet and a flow outlet aligned on a common longitudinal axis;
   a poppet disposed within said flow chamber along the common longitudinal axis between the flow inlet and the flow outlet, the poppet comprising:
   a hollow outer member defining a flow cavity therein, and an orifice defining an inlet to the flow cavity; and
   a telescoping inner member anchored to the hollow outer member and extendable from the flow cavity;
   a first spring biasing the poppet to abut the flow inlet below a predetermined pressure differential between a pressure at the flow inlet and a pressure at the flow outlet; and
   a second spring biasing the telescoping inner member from closing the flow outlet below a predetermined pressure differential between a pressure in the flow cavity and the pressure at the flow outlet.

14. A leak arresting flow control valve comprising:
   a housing defining a fluid flow chamber having a chamfered fluid inlet into the flow chamber and a chamfered fluid outlet out of the flow chamber, said housing including a threaded male member engaging a threaded female member, and said flow chamber including a recessed area about the outlet;
   first helical spring seated in the recessed area about the outlet with a longitudinal axis generally colinear with an axis common to the inlet and the outlet; and
   a poppet disposed within the fluid flow chamber comprising
      an outer poppet having a hollow cylindrical body captured within the first helical spring, the cylindrical body including an opening with an inner shoulder about the opening, the outer poppet further having a base of a diameter larger than a diameter of the cylindrical body defining a lip for receiving a force of the first helical spring, the base further including an o-ring to seal the inlet when the force from the first helical spring exceeds a force from a flow of fluid through the fluid inlet;
      an inner poppet within the cavity defined by the hollow cylindrical body of the outer poppet, the inner poppet having a cylindrical body of a length longer than the cylindrical body of the outer poppet and where the cylindrical body of the inner poppet protrudes through the opening in the cylindrical body of the outer poppet and includes an o-ring at an end to seal the fluid outlet when the inner poppet engages the fluid outlet, and further including a head having a diameter larger than a diameter of the cylindrical body of the inner poppet and smaller than a diameter of the opening in the cylindrical body of the outer poppet to capture the inner poppet within the outer poppet;
      a second helical spring disposed inside the cavity defined by the hollow cylindrical body of the outer poppet with a first end engaging the inner shoulder of the outer poppet and a second end engaging the head of the inner poppet such that said second helical spring biases the inner poppet within the outer poppet; and
      an orifice plate capping the outer poppet at an end opposite the opening, the orifice plate including an orifice for communicating a pressure at the fluid inlet to the cavity in the outer poppet.

* * * * *

UNITED STATES PATENT AND TRADEMARK OFFICE
CERTIFICATE OF CORRECTION

PATENT NO.     : 6,374,852 B1                                                Page 1 of 1
DATED          : April 23, 2002
INVENTOR(S)    : John D. Olivas et al.

It is certified that error appears in the above-identified patent and that said Letters Patent is hereby corrected as shown below:

<u>Title page,</u>
Item [75], Inventors, after "John D. Olivas, Houston, TX (US)" insert -- Mark C. Martis, Redondo Beach, CA (US); Patrick J. Cunningham, Redondo Beach, CA (US); William Ronald Martis, San Diego, CA (US); Juan Olivas, Jr., El Paso, TX (US) --.

Signed and Sealed this

Twenty-fourth Day of September, 2002

*Attest:*

*Attesting Officer*

JAMES E. ROGAN
*Director of the United States Patent and Trademark Office*